(12) United States Patent
Williamson (10) Patent No.: US 10,466,840 B2
(45) Date of Patent: Nov. 5, 2019

(54) APPARATUS, METHOD AND COMPUTER PROGRAM FOR ENABLING A USER TO MAKE USER INPUTS

(71) Applicant: Nokia Technologies Oy, Espoo (FI)

(72) Inventor: John Williamson, Glasgow (GB)

(73) Assignee: Nokia Technologies Oy, Espoo (FI)

( * ) Notice: Subject to any disclaimer, the term of this patent is extended or adjusted under 35 U.S.C. 154(b) by 206 days.

(21) Appl. No.: 15/108,989

(22) PCT Filed: Dec. 3, 2014

(86) PCT No.: PCT/FI2014/050947
§ 371 (c)(1),
(2) Date: Jun. 29, 2016

(87) PCT Pub. No.: WO2015/101703
PCT Pub. Date: Jul. 9, 2015

(65) Prior Publication Data
US 2016/0320915 A1      Nov. 3, 2016

(30) Foreign Application Priority Data

Jan. 2, 2014   (GB) .................................. 1400014.5

(51) Int. Cl.
*G06F 3/041*        (2006.01)
*G06F 3/0488*       (2013.01)
*G06F 3/044*        (2006.01)

(52) U.S. Cl.
CPC ............ *G06F 3/0418* (2013.01); *G06F 3/044* (2013.01); *G06F 3/0416* (2013.01); *G06F 3/04883* (2013.01); *G06F 2203/04108* (2013.01)

(58) Field of Classification Search
None
See application file for complete search history.

(56) References Cited

U.S. PATENT DOCUMENTS

| | | | |
|---|---|---|---|
| 2005/0243061 A1* | 11/2005 | Liberty ................ | A61B 5/1171 345/158 |
| 2010/0310136 A1 | 12/2010 | Tsuda ............................ | 382/124 |
| 2011/0118026 A1* | 5/2011 | Lukas ................... | G06F 3/0383 463/37 |
| 2011/0234639 A1* | 9/2011 | Shimotani .......... | G01C 21/3664 345/661 |
| 2012/0068876 A1 | 3/2012 | Bangera et al. ................ | 342/27 |
| 2013/0154952 A1 | 6/2013 | Hinckley et al. ............. | 345/173 |

FOREIGN PATENT DOCUMENTS

JP           2005525635 A         8/2005

* cited by examiner

*Primary Examiner* — Christopher R Lamb
(74) *Attorney, Agent, or Firm* — Harrington & Smith (57) ABSTRACT

An apparatus, method and computer program wherein the apparatus includes processing circuitry; and memory circuitry including computer program instructions; wherein the memory circuitry and the computer program instructions are configured to, with the processing circuitry, cause the apparatus to: detect a user input including one or more fingers; identify a tremor characteristic for each of the one or more fingers; determine a correlation between the tremor characteristic of a first finger and another detected tremor characteristic; wherein if the correlation is above a threshold a first output signal is provided and if the correlation is below a threshold a second output signal is provided.

20 Claims, 9 Drawing Sheets

APPARATUS, METHOD AND COMPUTER PROGRAM FOR ENABLING A USER TO MAKE USER INPUTS

TECHNOLOGICAL FIELD

Examples of the present disclosure relate to an apparatus, method and computer program for enabling a user to make user inputs. In particular, they relate to an apparatus, method and computer program for enabling a user to make user inputs using a touch pad where the user need not make direct contact with the touch pad.

BACKGROUND

Apparatus which use touch pads which enable a user to make user inputs are known. Such touch pads may comprise sensors which may be configured to provide an output signal when the user touches the touch pad or when they bring an object, such as their finger, close to the touch pad. Such touch pads may comprise capacitive sensors or infra red sensors or any other suitable types of sensors.

Such apparatus may be configured to recognise when a user is using a plurality of fingers to make a user input. The plurality of fingers could be on one hand or on different hands and could even belong to more than one user. It may be useful to provide an apparatus which can recognise when the plurality of fingers belong to one hand and when the plurality of fingers belong to different hands.

BRIEF SUMMARY

According to various, but not necessarily all, examples of the disclosure there may be provided an apparatus comprising: processing circuitry; and memory circuitry including computer program instructions; wherein the memory circuitry and the computer program instructions are configured to, with the processing circuitry, cause the apparatus to: detect a user input comprising one or more fingers; identify a tremor characteristic for each of the one or more fingers; determine a correlation between the tremor characteristic of a first finger and another detected tremor characteristic; wherein if the correlation is above a threshold a first output signal is provided and if the correlation is below a threshold a second output signal is provided.

In some examples the user input may comprise a plurality of fingers and a tremor characteristic may be identified for each of the plurality of fingers. A correlation between the tremor characteristics for the plurality of fingers may be determined.

In some examples if the correlation is above a threshold it may be determined that the plurality of fingers belong to the same hand and if the correlation is below a threshold a second output it may be determined that the plurality of fingers belong to different hands.

In some examples the detected user input may comprise one or more fingers being positioned close to a touch pad.

In some examples the first output signal may cause a first function to be performed and the second output signal may cause a second different function to be performed.

In some examples the tremor characteristic may comprise the phase of the tremor.

In some examples the tremor characteristic may comprise the amplitude of the tremor.

In some examples the touch pad may comprise a capacitive touch pad

In some examples the tremor may be caused by unintentional movement of a user of the apparatus.

In some examples the tremor may cause fluctuations in the signals provided by sensors within the touch pad.

In some examples there may be provided an electronic device comprising an apparatus as described above.

In some examples there may be provided a mobile telephone comprising an apparatus as described above.

According to various, but not necessarily all, examples of the disclosure there may be provided a method comprising: detecting a user input comprising one or more fingers; identifying a tremor characteristic for each of the one or more fingers; determining a correlation between the tremor characteristic of a first finger and another detected tremor characteristic; wherein if the correlation is above a threshold a first output signal is provided and if the correlation is below a threshold a second output signal is provided.

In some examples the user input may comprise a plurality of fingers and a tremor characteristic may be determined for each of the plurality of fingers. A correlation between the tremor characteristics for the plurality of fingers may be determined.

In some examples if the correlation is above a threshold it may be determined that the plurality of fingers belong to the same hand and if the correlation is below a threshold it may be determined that the plurality of fingers belong to different hands.

In some examples the detected user input may comprise one or more fingers being positioned close to a touch pad.

In some examples the first output signal may cause a first function to be performed and the second output signal may cause a second different function to be performed.

In some examples the tremor characteristic may comprise the phase of the tremor.

In some examples the tremor characteristic may comprise the amplitude of the tremor.

In some examples the touch pad may comprise a capacitive touch pad.

In some examples the tremor may be caused by unintentional movement of a user of the apparatus.

In some examples the tremor may cause fluctuations in the signals provided by sensors within the touch pad.

According to various, but not necessarily all, examples of the disclosure there may be provided a computer program comprising computer program instructions that, when executed by processing circuitry, enable an apparatus at least to perform: detecting a user input comprising one or more fingers; identifying a tremor characteristic for each of the one or more fingers; determining a correlation between the tremor characteristic of a first finger and another detected tremor characteristic; wherein if the correlation is above a threshold a first output signal is provided and if the correlation is below a threshold a second output signal is provided.

According to various, but not necessarily all, examples of the disclosure there may be provided a computer program comprising program instructions for causing a computer to perform any of the methods described above.

According to various, but not necessarily all, examples of the disclosure there may be provided a physical entity embodying the computer program as described above.

According to various, but not necessarily all, examples of the disclosure there may be provided an electromagnetic carrier signal carrying the computer program as described above.

The apparatus may be for controlling an electronic device where the electronic device may comprise a touch pad. The electronic device may be, for example, a communications device or any other suitable type of device.

BRIEF DESCRIPTION

For a better understanding of various examples that are useful for understanding the detailed description, reference will now be made by way of example only to the accompanying drawings in which.

DETAILED DESCRIPTION

The Figures illustrate an apparatus 1 comprising: processing circuitry 3; and memory circuitry 5 including computer program instructions 11; wherein the memory circuitry 5 and the computer program instructions 11 are configured to, with the processing circuitry 3, cause the apparatus 1 to: detect 51 a user input comprising one or more fingers 41; identify 53 a tremor characteristic for each of the one or more fingers 41; determine 55 a correlation between the tremor characteristic of the finger and another identification tremor characteristic; wherein if the correlation is above a threshold a first output signal 57 is provided and if the correlation is below a threshold a second output signal 59 is provided.

A user's fingers have natural tremor. The tremor is caused by oscillations in the muscles in the arms. This means that there may be some synchronization in the tremors of each of the fingers of a single hand. The tremors for the fingers on a given hand may have a characteristic frequency and be in phase with each other. However the characteristics of the tremor may be different for different hands. This would be the case where the different hands belong to different users and also where the different hands belong to the same user.

Tracking the tremor of fingers used to make user inputs using a touch pad may enable an apparatus to distinguish between user inputs made with a plurality of fingers belong to one hand and user inputs made with a plurality of fingers belonging to different hands.

In some examples tracking the tremor of a finger used to make an input may enable an apparatus to determine whether the finger being used to make an input belongs to the hand holding the device.

Figure 1:
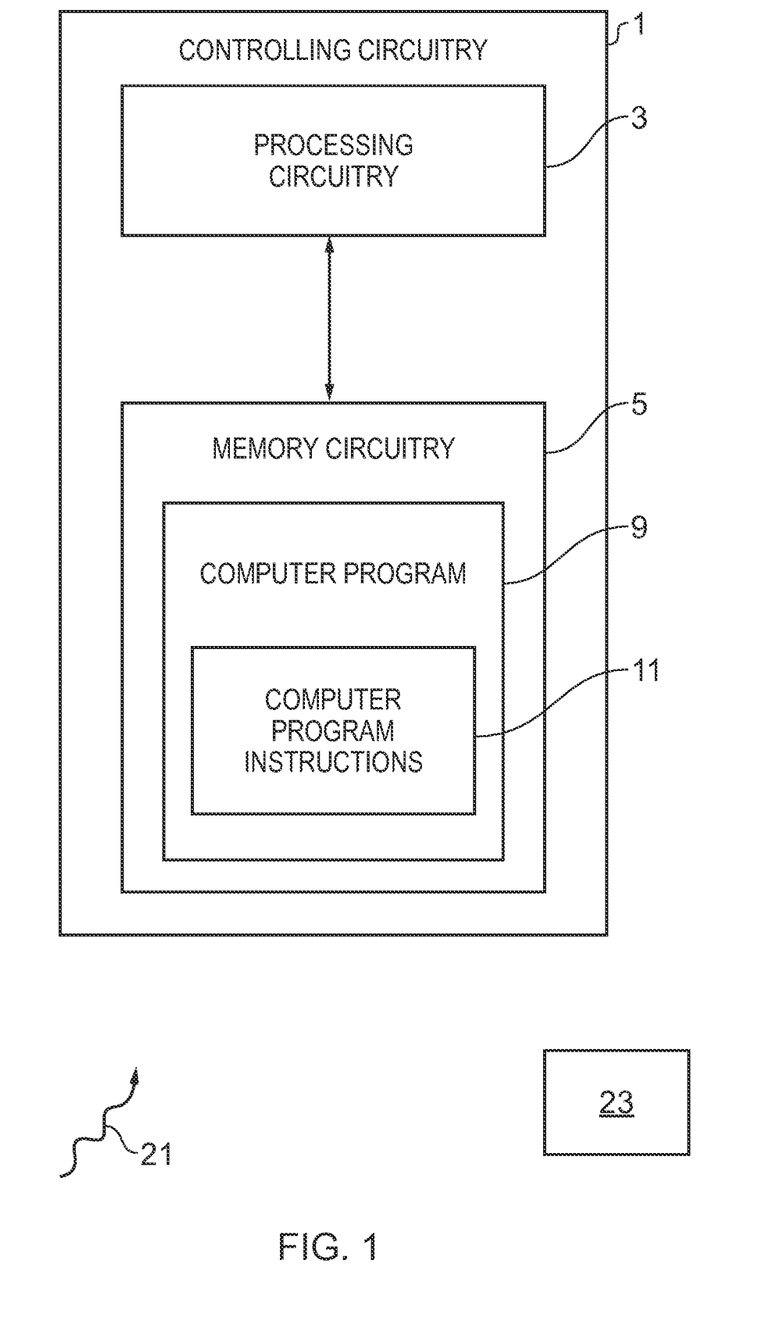
FIG. 1 illustrates an apparatus.

FIG. 1 illustrates an example apparatus 1 which may be used to track the tremor of fingers when a user makes user inputs on a touch pad or other suitable user input device. The apparatus 1 may be for example a chip or chip set. The apparatus 1 of FIG. 1 may be provided within an electronic device, such as a mobile telephone or gaming device, which may comprise a user input device such as a touch pad.

The apparatus 1 comprises controlling circuitry 13. In the illustrated example the controlling circuitry 13 comprises processing circuitry 3 and memory circuitry 5.

The controlling circuitry 13 provides means for controlling the apparatus 1. The controlling circuitry 13 may provide means for controlling an electronic device. The controlling circuitry 13 may be implemented using instructions that enable hardware functionality, for example, by using executable computer program instructions 11 in one or more general-purpose or special-purpose processing circuitry 3 that may be stored on a computer readable storage medium 23 (e.g. disk, memory etc.) to be executed by such processing circuitry 3.

The controlling circuitry 13 may be configured to enable the apparatus 1 to detect a user input comprising one or more fingers; identify a tremor characteristic for each of the one or more fingers; determine a correlation between the tremor characteristic of a first finger and another tremor characteristic; wherein if the correlation is above a threshold a first output signal is provided and if the correlation is below a threshold a second output signal is provided.

The processing circuitry 3 may also be configured to write to and read from the memory circuitry 5. The processing circuitry 3 may also comprise an output interface via which data and/or commands are output by the processing circuitry 3 and an input interface via which data and/or commands are input to the processing circuitry 3.

The memory circuitry 5 may be configured to store a computer program 9 comprising computer program instructions 11 (computer program code) that controls the operation of the apparatus 1 when loaded into the processing circuitry 3. The computer program instructions 11 may provide the logic and routines that enable the apparatus 1 to perform the example methods illustrated in FIGS. 5 and 6. The processing circuitry 3 by reading the memory circuitry 5 may be able to load and execute the computer program 9.

The computer program instructions 11 may provide computer readable program means configured to control the apparatus 1. The computer program instructions 11 may provide, when loaded into the processing circuitry 3; means for detecting a user input comprising one or more fingers; means for identifying a tremor characteristic for each of the one or more fingers; means for determining a correlation between the tremor characteristic of a first finger and another detected tremor characteristic; wherein if the correlation is above a threshold a first output signal is provided and if the correlation is below a threshold a second output signal is provided.

The computer program 9 may arrive at the apparatus 1 via any suitable delivery mechanism 21. The delivery mechanism 21 may be, for example, a computer-readable storage medium, a computer program product 23, a memory device, and a record medium such as a CD-ROM or DVD, an article of manufacture that tangibly embodies the computer program 9. The delivery mechanism may be a signal configured to reliably transfer the computer program 9. The apparatus 1 may propagate or transmit the computer program 9 as a computer data signal.

Although the memory circuitry 5 is illustrated as a single component in FIG. 1 it may be implemented as one or more separate components some or all of which may be integrated/removable and/or may provide permanent/semi-permanent/dynamic/cached storage.

Although the processing circuitry 3 is illustrated as a single component in FIG. 1 it may be implemented as one or more separate components some or all of which may be integrated/removable.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (e.g. Von Neumann)/parallel architectures but also specialized circuits such as field-programmable gate arrays (FPGA), application specific integration circuits (ASIC), signal processing devices and other devices. References to computer programs, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Figure 2:
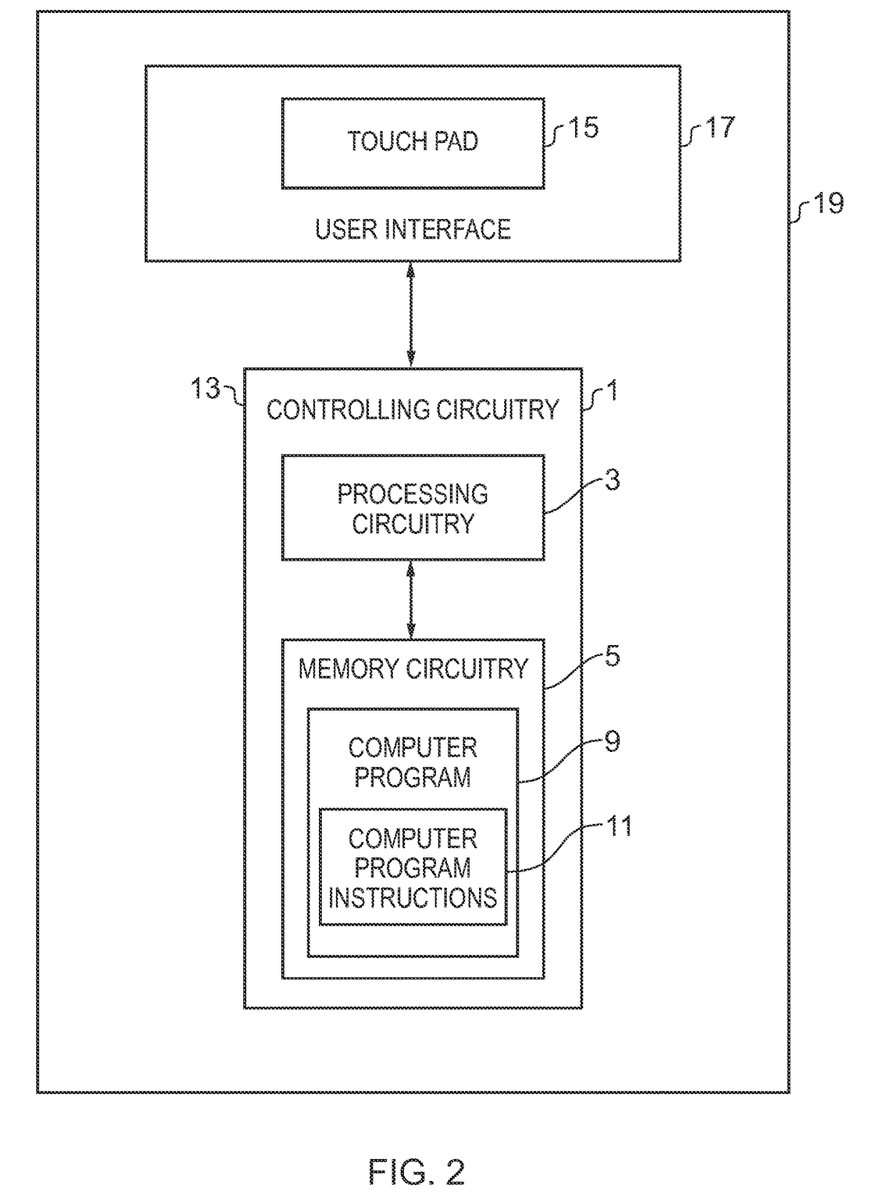
FIG. 2 illustrates an electronic device comprising an apparatus.

FIG. 2 schematically illustrates an electronic device 19 according to an example of the disclosure. The electronic device 19 may comprise an apparatus 1 as described above in relation to FIG. 1. Corresponding reference numerals are used for corresponding features.

The electronic device 19 may be any electronic device 19 which enables a user to make a user input using a touch pad 15. In particular the electronic device 19 may be any electronic device 19 which enables a user to make a user input using a touch pad 15 where the user need not make direct contact with the touch pad 15 but can just position their fingers, or other object, close to the touch pad.

The electronic device 19 may be, for example, a mobile cellular telephone, a tablet computer, a personal computer, a camera, a gaming device, a personal digital assistant, an electronic book reader, a personal music player, a television or any other suitable electronic device 19. The electronic device 19 may be a handheld electronic device 19 which can be carried in a user's hand or bag. The electronic device 1 may be a hand held device such that it is sized and shaped so that the user can hold the electronic device 19 in their hand while they are using the electronic device 19.

It is to be appreciated that only features necessary for the understanding of the description are illustrated in FIG. 2. The electronic device 19 may comprise additional features that are not illustrated. For example, in examples where the electronic device 19 is a mobile cellular telephone or other communications device, the electronic device 19 may also comprise one or more transmitters and receivers configured to enable wireless communication. In some examples the electronic device 19 may also comprise one or more motion sensors which may be configured to detect movement of a user's hand when the user is holding the electronic device 19. The motion sensors may comprise accelerometers, gyroscopes, magnetometers or any other suitable sensor.

Figure 3:
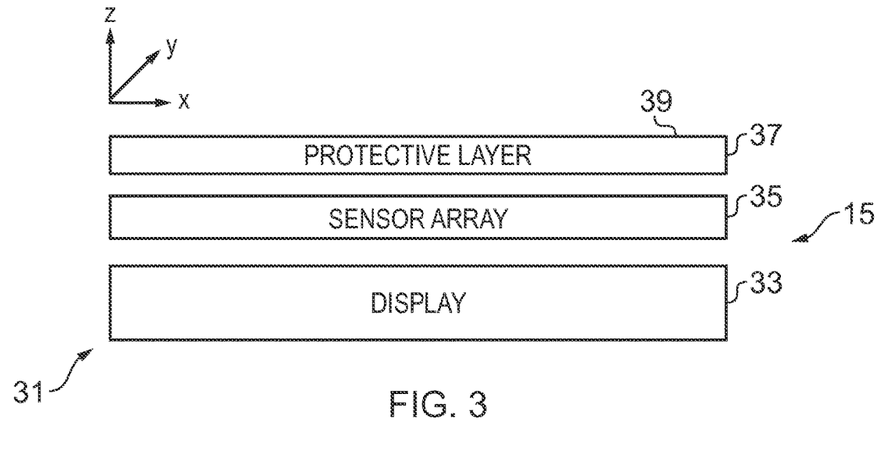
FIG. 3 illustrates a touch pad.

The electronic device 19 illustrated in FIG. 2 comprises: a user interface 17 and an apparatus 1. The apparatus 1 may comprise controlling circuitry 13 as described above in relation to FIG. 1. The user interface 17 may comprise a touch pad 15. The touch pad 15 may be part of a touch sensitive display 31 as illustrated in FIG. 3.

The controlling circuitry 13 may be configured to control the electronic device 19 to perform a plurality of different functions. For example, where the electronic device 19 is provided within a mobile cellular telephone the controlling circuitry 13 may be configured to control the electronic device 19 to make and receive telephone calls and also to perform other functions such as send messages or access communication networks. The controlling circuitry 13 may be configured to receive input commands from the user interface 17 and also to provide output commands to the user interface 17.

In the example illustrated in FIG. 2 the user interface 17 comprises a touch pad 15. In some examples the user interface 17 may also comprise other user input devices such as a keypad, a joystick or navigation key or a combination of different types of user input devices. In some examples the user interface 17 may also comprise user output devices such as a display or audio output device or any other suitable output device.

The touch pad 15 may comprise any means which may enable a user to make an input into the apparatus 1 by touching the surface of the touch pad 15 with an object or bringing an object into proximity of the surface of the touch pad 15. The objects used to make the user input could be any of a user's fingers including their thumbs.

The touch pad 15 may comprise means which enables a user of the electronic device 19 to input information into the apparatus 1. The information may be used to control the electronic device 19.

The touch pad 15 may be configured to detect hovering inputs. For example the touch pad 15 may be configured to detect a finger, or other part of a user's body when it is positioned close to but not making direct contact with the touch pad. In some examples the touch pad 15 may be configured to detect the user's fingers when the fingers are several centimeters away from the touch pad 15.

In some examples the touch pad 15 may be part of touch sensitive display. An example touch sensitive display is illustrated schematically in FIG. 3.

FIG. 3 illustrates a cross section through an example touch sensitive display 31. FIG. 3 also illustrates a reference coordinate axis. In this example the x axis runs horizontally and parallel with the surface of the touch pad 15, the y axis extends into the page and runs parallel with the surface of the touch pad 15 and the z axis extends vertically in a direction perpendicular to the surface of the touch pad 15.

The example touch sensitive display 31 of FIG. 3 comprises a display 33, a sensor array 35 and a protective layer 37. It is to be appreciated that in other examples the touch sensitive display 31 may comprise other components.

The display 33 may comprise any means which enables information to be displayed to a user of the electronic device 19. The information may correspond to information which has been input by the user via the touch pad 15 and/or information which is stored in the memory circuitry 5 or any other information.

The display 33 may comprise any suitable display such as a liquid crystal display, light emitting diode, organic light emitting diode, thin film transistor or any other suitable type of display.

The sensor array 35 may be positioned overlaying the display 33. The sensor array 35 may comprise any means which may be configured to detect user inputs. The sensor array 35 may be configured to detect a user input comprising a plurality of fingers. A user may make such a user input by positioning one or more fingers close to the touch pad 15 without touching the touch pad 15. In some examples the sensor array 35 may be configured to detect the one or more fingers when they are positioned within a few centimeters of the touch pad. In some examples the sensor array 35 may also detect user inputs where the user touches the touch pad 15.

The sensor array 35 may comprise any suitable type of sensors. In some examples the sensor array 35 may comprise one or more capacitive sensors. The capacitive sensors may comprise a layer of capacitive material. In some embodiments of the disclosure the capacitive material may be arranged in a grid or other suitable array. The capacitive material may be transparent to enable the display 33 to be visible though the sensor array 35. The capacitive material may comprise any suitable material such as indium tin oxide.

The capacitive material may be configured to detect a user input when a user brings an object, such as their finger, close to the surface of the touch pad 15. This causes charge to be sourced or sunk by the capacitive sensor which changes the capacitance of the sensor. This enables the user input to be detected and causes the sensor array 35 to provide an output signal indicative of the user input. The output signal may be provided to processing circuitry 3 and may be analysed to obtain information about the user input which was made. The information may comprise the location of the user's fingers which could be in any one or more of the x, y or z direction, the duration of the user input or any other suitable information. In some examples the output signal may be analysed to identify tremor characteristics of fingers used to make the user input.

The sensor array 35 may comprise other types of sensor instead of, or in addition to, capacitive sensors. For example, the sensor array 35 may comprise infra red sensors which may also be configured to detect the position of a user's finger relative to the touch pad 15. The infra red sensors may also be able to provide location information comprising an indication of the location in the x, y and z directions.

In the example embodiment of FIG. 3 a protective layer 37 is provided overlaying the sensor array 35 and display 33. The protective layer 37 may provide a surface 39 which the user of the apparatus 1 can touch to make user inputs.

In some examples the protective layer 37 may form part of a housing of the electronic device 19. The surface 39 of the protective layer 37 may form a part of the outer surface of the electronic device 19.

The protective layer 37 may be transparent so that the display 33 is visible through the protective layer 37. The protective layer 37 may comprise an insulating material.

Figure 4A:
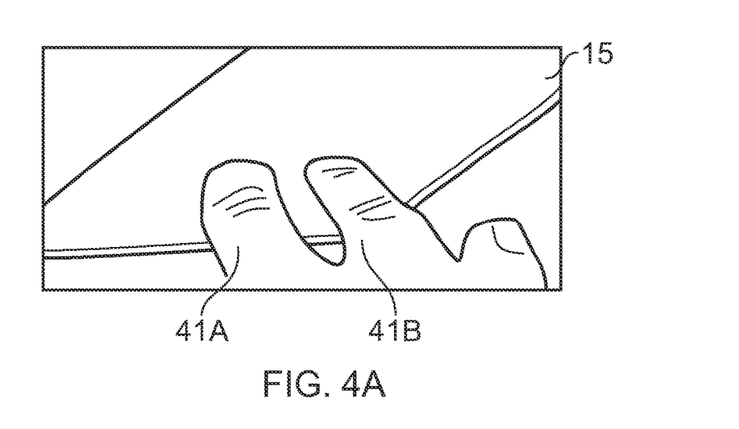
FIGS. 4A and 4B illustrate a user making user inputs using a touch pad.
Figure 4B:
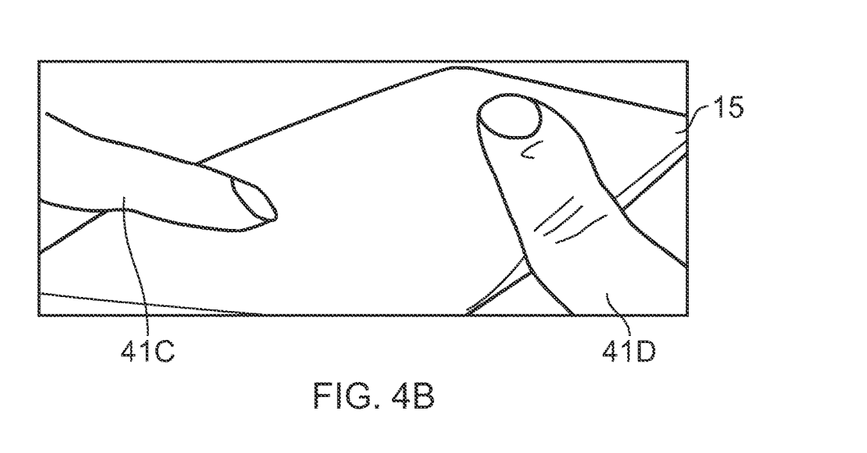

FIGS. 4A and 4B illustrate a user making a user input via a touch pad 15. The touch pad 15 may be as described above with reference to FIGS. 1 to 3.

In both FIGS. 4A and 4B the user is using a plurality of fingers 41 to make the user input. The user may make the user input by positioning their fingers 41 close to the touch pad 15. In the example of FIGS. 4A and 4B the user may make the user input without directly touching the touch pad 15. The sensor array 35 may detect the fingers 41 and provide a corresponding output signal.

In the example of FIG. 4A the user is making a user input using a first finger 41A and a second finger 41B. The first finger 41A and the second finger 41B belong to the same hand.

In the example of FIG. 4B the user is making a user input using a third finger 41C and a fourth finger 41D. The third finger 41C and the fourth finger 41D belong to different hands. In some examples the different hands may belong to the same user. In other examples the different hands belong to different users.

The apparatus 1 described above may be configured to distinguish between the user inputs of FIGS. 4A and 4B. This may enable different functions to be associated with the different user inputs.

Figure 5:
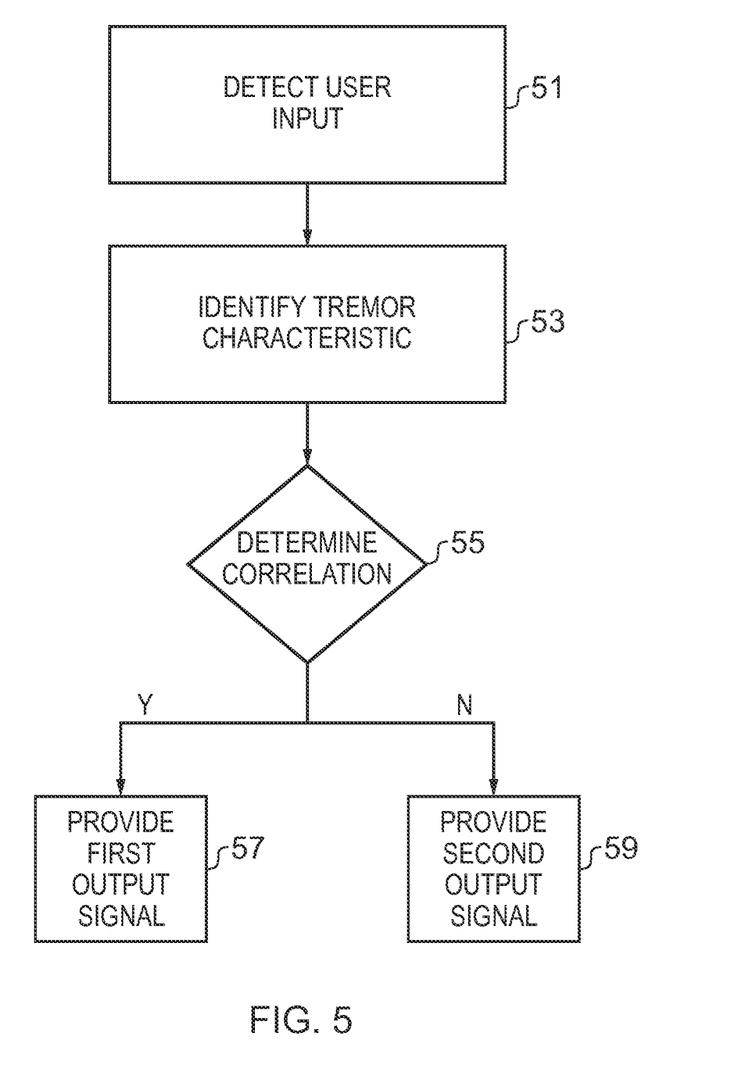
FIG. 5 illustrates a method.

FIG. 5 illustrates an example method which may be used to distinguish between the user inputs of FIGS. 4A and 4B. The method may be implemented using the apparatus 1 and touch pads 15 as described above with reference to FIGS. 1 to 4.

The example method comprises, at block 51, detecting a user input comprising one or more fingers 41. The fingers 41 may comprise any of a user's fingers 41 including their thumbs. The user input may comprise a plurality of fingers 41. The detected user input may comprise the plurality of fingers 41 being positioned close to a touch pad 15. The user need not touch the touch pad 15 to make the user input.

At block 53 the method comprises identifying a tremor characteristic. A tremor characteristic may be determined for each of the plurality of fingers 41. In some examples other tremor characteristics could be identified. For example the tremor of a user's hand which is holding the electronic device 19 may be detected using a sensor.

The tremor may comprise shaking of the user's fingers 41. The tremor may be caused by unintentional movement of a user of the apparatus 1. The tremor may be caused by unintentional movement of muscles in an arm of a user of the apparatus 1. The tremor may comprise movement in the z direction, that is, the tremor may comprise a variation in the height of the fingers 41 relative to the touch pad 15. In other examples the tremor may also cause movement of the fingers 41 in the x and z directions.

The tremor characteristic may comprise any measurable or detectable parameter of the tremor. In some examples the tremor characteristic may comprise the phase of the tremor. In other examples the tremor characteristic may comprise the frequency or the amplitude or any other suitable characteristic.

At block 55 the method comprises determining a correlation between the tremor characteristics. If it is determined that the correlation is above a threshold a first output signal is provided at block 57. If it is determined that the correlation is below a threshold a second output signal is provided at block 59.

If the correlation for a plurality of fingers 41 is above a threshold it is determined that the plurality of fingers 41 belong to the same hand and if the correlation is below a threshold a second output it is determined that the plurality of fingers 41 belong to different hands. This may enable the apparatus 1 to distinguish between the user inputs of FIGS. 4A and 4B.

The output signals may be provided by the apparatus 1. The output signals may be provided to other components within the electronic device 19. The first output signal may cause a first function to be performed by the apparatus 1 and the second output signal may cause a second, different function to be performed by the apparatus 1.

Figure 6:
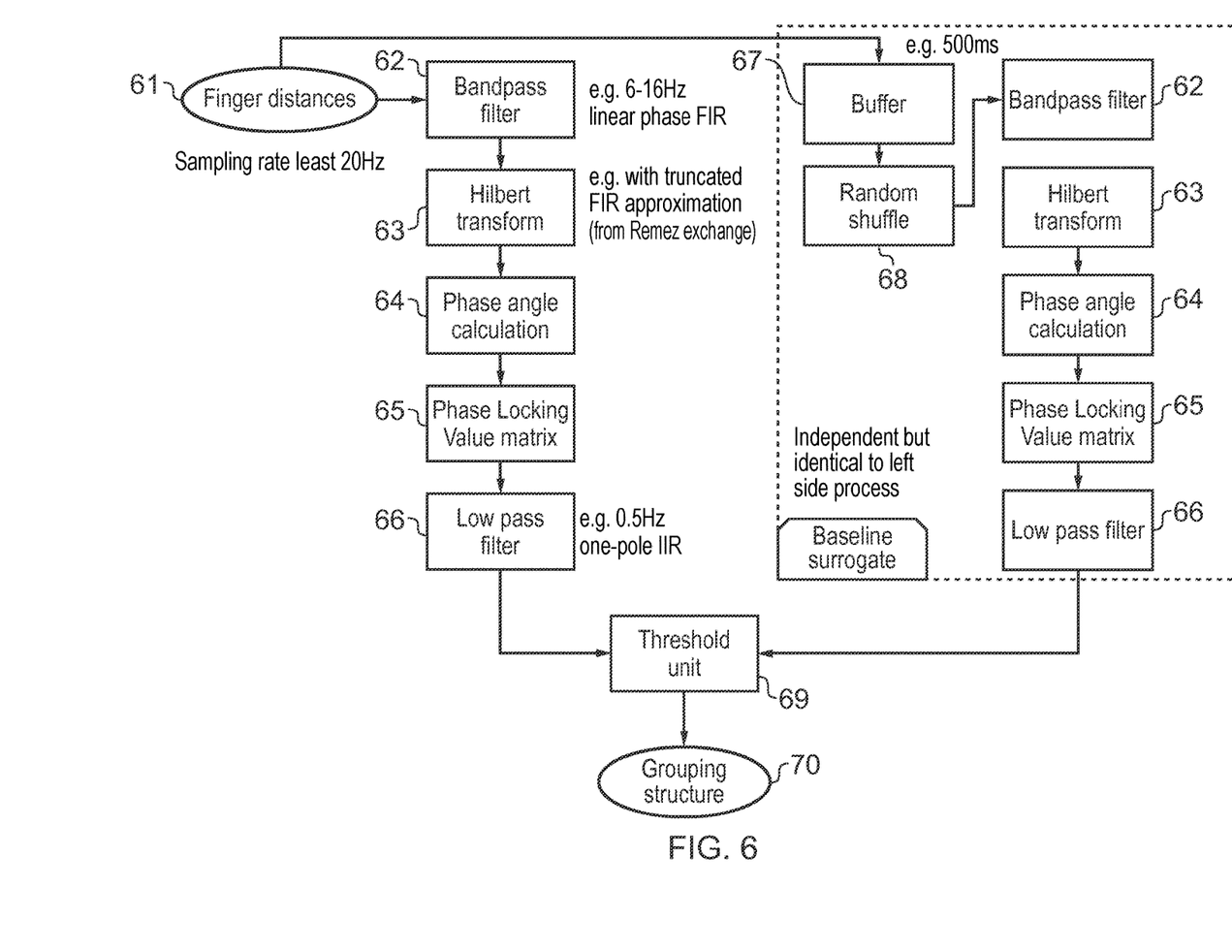
FIG. 6 illustrates a method.

FIG. 6 illustrates another example method which may be used to distinguish between the user inputs of FIGS. 4A and 4B. The method may also be implemented using the apparatus 1 and touch pads 15 as described above with reference to FIGS. 1 to 4.

The method may be implemented when the user makes a user input comprising a plurality of fingers 41. The user may make the user input by positioning the fingers 41 close to, but not touching, the touch pad 15.

At block 61 the apparatus 1 obtains an estimate of the finger distance for each of the plurality of fingers 41 as a time series. The finger distance may be the distance between the surface 39 of the touch pad 15 and the finger 41. The finger distance may be the height of the finger 41 above the touch pad 15 in the z direction. The fluctuations in the height of the finger 41 may provide an indication of the tremor in the user's fingers 41.

The sampling rate used to obtain the time series may be between 15 and 1000 Hz. In some examples the sampling rate may be between 30 to 100 Hz. As an example the sampling rate used could be approximately 60 Hz.

The finger distance information may be provided as a time series which comprises a series of height values $z_1, z_2, \ldots z_n$. A time series may be provided for each detected finger 41. The time series may be processed to determine whether the fingers 41 belong to the same hand or to different hands.

Figure 8A:
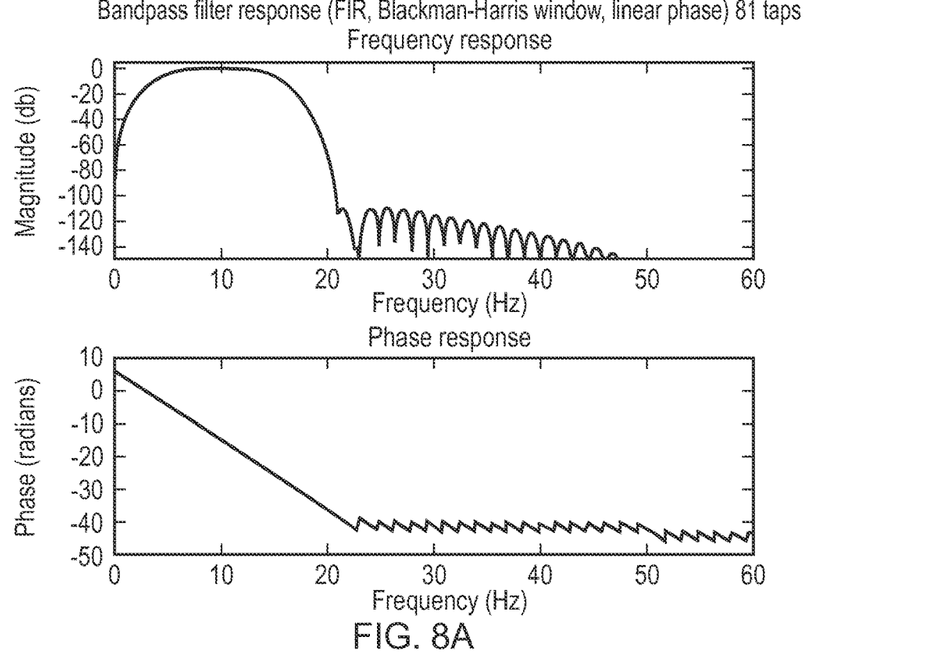
FIGS. 8A and 8B illustrate plots of a frequency response of a band pass filter and a signal obtained from the filter.

At block 62 each time series is filtered to isolate the tremor frequency. The filter may remove variations in the height caused by intentional movement of the finger 41 from the signal. The intentional movement of the finger 41 has a much lower frequency than the tremor. The filter used may comprise a band pass filter. The filter pass band may be approximately 6 Hz to 18 Hz. The filter used may be linear in phase. FIG. 8A illustrates an example filter response.

The output of the filter is a filtered time series $p_n$.

At block 63 a Hilbert transform is applied to the filtered time series $p_n$ to obtain the quadrature signal $q_n$. This can be implemented with an FIR (finite impulse response) approximation to the true Hilbert transformation.

At block 64 the phase angle is computed. The phase angle may be computed for each of the points in the filtered time series $p_n$. The phase angle may be computed for each of the points in the filtered time series $p_n$ for each of the fingers 41 which have been detected.

The phase angle may be given by $\varphi_n = \text{atan}(p_n, q_n)$.

At block 65 a matrix V of phase locking values is computed. The phase locking values may give a measure of the correlation or synchronisation of the tremor in the detected fingers 41.

The matrix V of phase locking values is given by $v_{k,j} = e^{(i(\varphi j - \varphi k))}$ for each finger k and each finger j.

At block 66 the matrix V of phase locking values may be filtered using a low pass filter. The low pass filter may comprise a simple one pole infinite impulse response (IIR) filter. The filter may have a roll-off of about 0.5 Hz to smooth out the obtained values.

The output of the low pass filter is the phase locking matrix u. The values of the phase locking matrix u may be used to determine whether or not there is a correlation in the phase of the tremor in the detected fingers.

Blocks 62 to 66 may be repeated to obtain one or more surrogate phase locking matrices $u_1, u_2 \ldots$. The surrogate phase locking matrices may increase the statistical robustness of the method.

To obtain the surrogate phase locking matrices $u_1, u_2 \ldots$ the method comprises, at block 67, storing the time series in a buffer. The buffer may be part of the memory circuitry 5. At block 68 the time series is randomly shuffled and then blocks 62 to 66 are repeated on the shuffled time series. The method carried out on the shuffled time series may be identical but independent to the method carried out on the unshuffled time series.

At block 69 the phase locking matrix u is compared with the one or more surrogate phase locking matrices $u_1, u_2 \ldots$ to determine whether there is any correlation between the phase of the tremor for each of the detected fingers 41.

If only one surrogate phase locking matrix $u_1$ is provided then the correlation may be determined by comparing the phase locking matrix u with the surrogate phase locking matrix $u_1$ and determining whether the difference is above or below a threshold.

If more than one surrogate phase locking matrices $u_1, u_2 \ldots$ are provided then the correlation may be determined by computing a statistical measurement such as the z score. The z score gives a measure of the deviation from the mean and may be given by $z = (x - \bar{x})/s$ where $\bar{x}$ is the mean and s is the standard deviation.

The comparisons of the matrices may provide a matrix s. The element of the matrix $s_{i,j}$ may have a value of 1 whenever the corresponding element of the phase locking matrix $u_{i,j}$ is significantly larger than the corresponding values in the surrogate matrices. The element of the matrix $s_{i,j}$ may have a value of 1 whenever the difference between the corresponding element of the phase locking matrix $u_{i,j}$ and the corresponding elements in the surrogate matrices is above a threshold value. The matrix s may be a symmetric binary matrix.

At block 70 it is determined which of the fingers belong to a first hand and which belong to a different hand. Whenever the value of an element in the matrix s is 1 then the fingers are from the same hand. It may be that all of the fingers are from the same hand.

Whenever the value of an element in the matrix s is not 1 then the fingers are from different hands.

The output signal which is provided in response to the detected user input may depend on whether the fingers 41 are form one hand or are from different hands. If the fingers 41 are from one hand a first control signal which causes a first function to be performed may be provided. If the fingers 41 are from different hands a second control signal which causes a second, different function to be performed may be provided.

Figure 7:
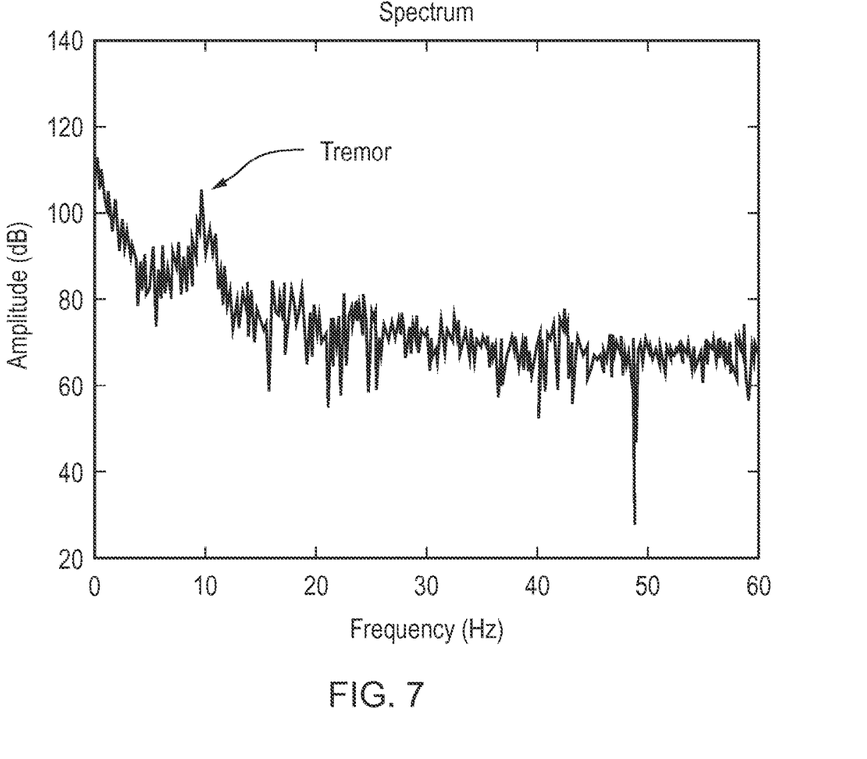
FIG. 7 illustrates a plot of z-axis movement of a user's finger.

FIG. 7 illustrates a plot of z-axis movement of a user's finger. FIG. 7 provides a spectrogram of movement of a user's finger 41 in the z-axis relative to the touch pad 15. The spectrogram of FIG. 7 is obtained from the fast Fourier transform (FFT) of 10 seconds of recorded data. The spectrogram shows a peak at around 10 Hz which is attributable to the tremor in the user's fingers. 41.

FIG. 8A illustrate plots of a frequency response and phase response of a band pass filter which may be used to implement the methods described above with reference to FIGS. 5 and 6. The filter may be used to isolate the tremor frequency. The filter may be used to isolate the tremor frequency from the series of height values.

The filter comprises a linear phase response. The filter may comprise a finite impulse response (FIR) filter. The filter of FIG. 8A is designed using a window method with a Blackman-Harris window. It is to be appreciated that other types of window may be used in other implementations.

Figure 8B:
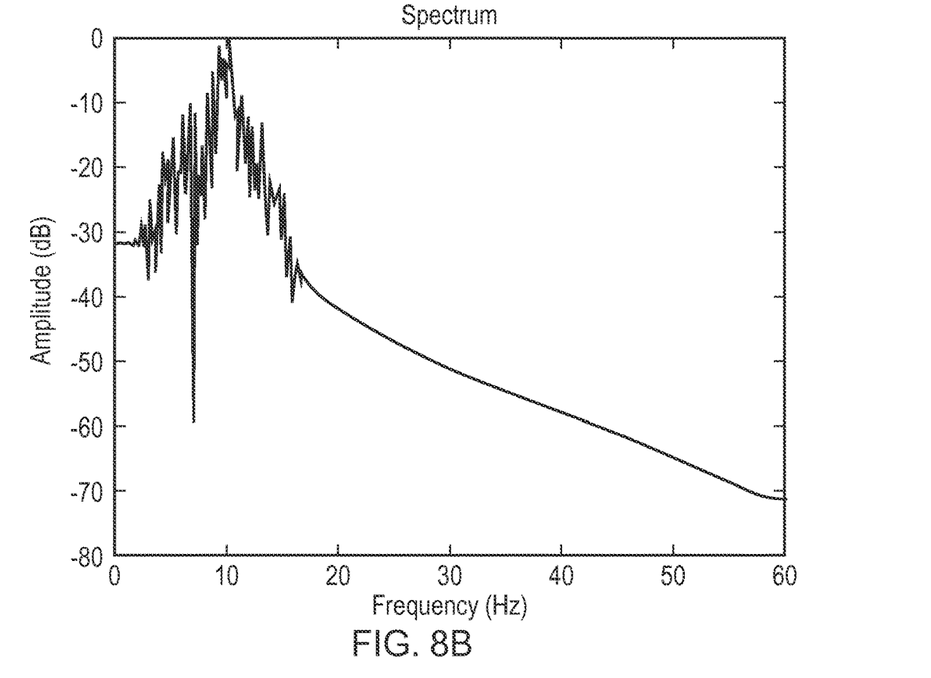

FIG. 8B illustrates the frequency spectrum of the signal after the filter has been applied.

Figure 9A:
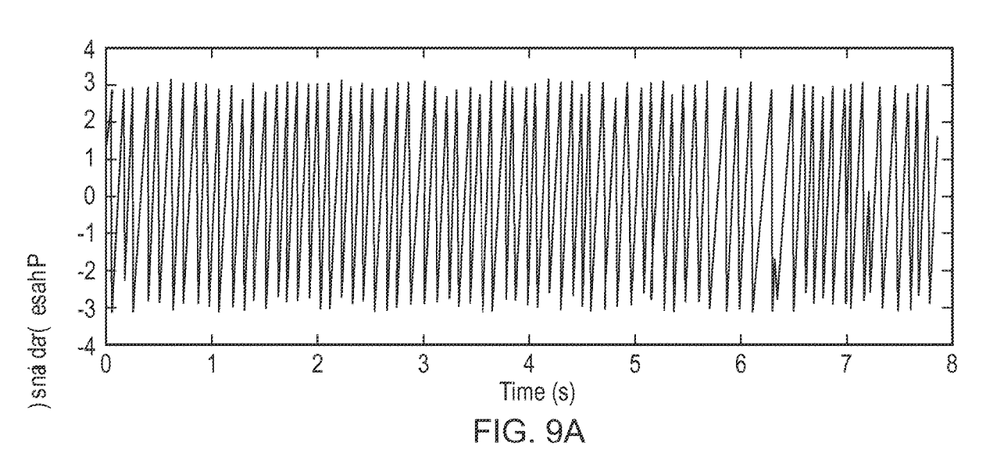
FIGS. 9A and 9B illustrate plots of a time series of the phase angle of two fingers.
Figure 9B:
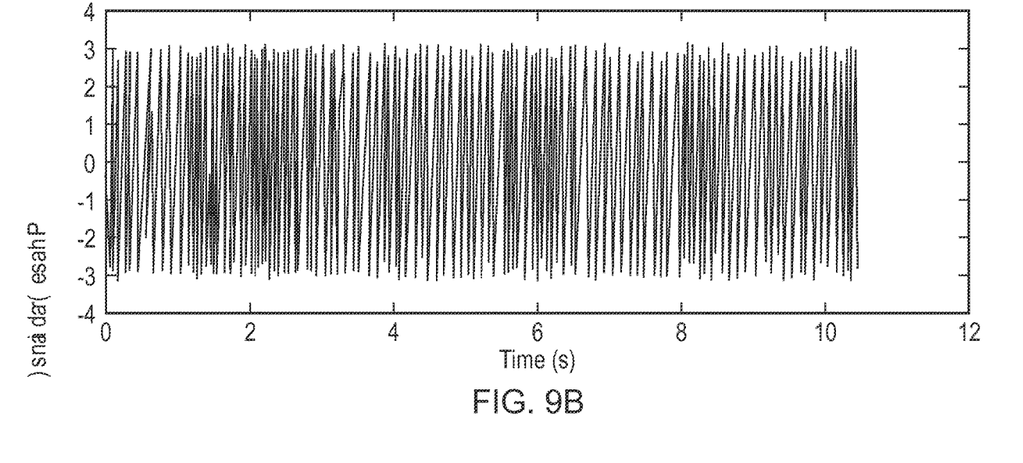

FIGS. 9A and 9B illustrate a plot of a time series of the phase angle of two fingers 41. In FIG. 9A the two fingers 41 are on the same hand. In FIG. 9A the two plots almost entirely overlap. This indicates a strong correlation of the phase.

In FIG. 9B the fingers 41 are from different hands. In FIG. 9B the two plots have very little overlap. This indicates a weak correlation of the phase.

Figure 10A:
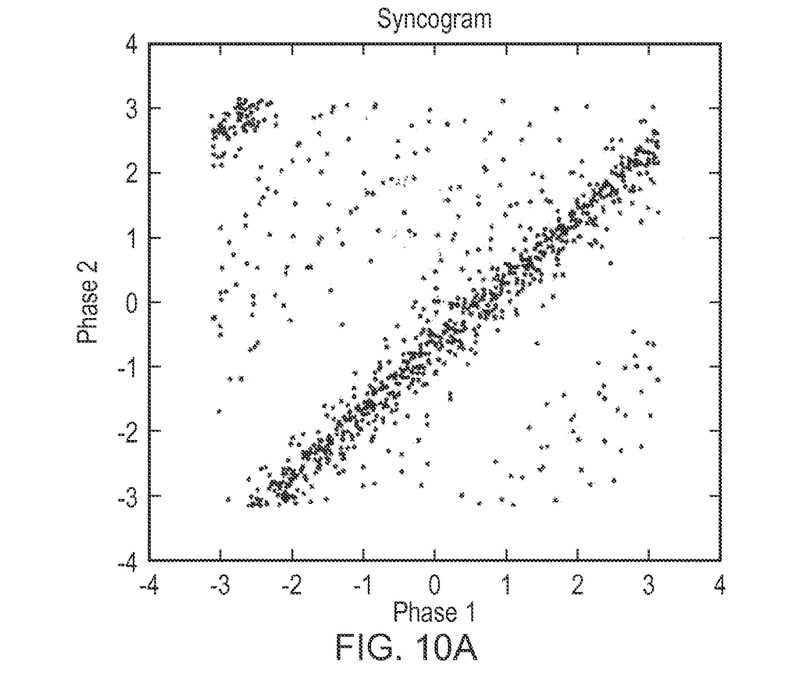
FIGS. 10A and 10B illustrate plots of a phase angle of a first finger against a phase angle of a second finger.
Figure 10B:
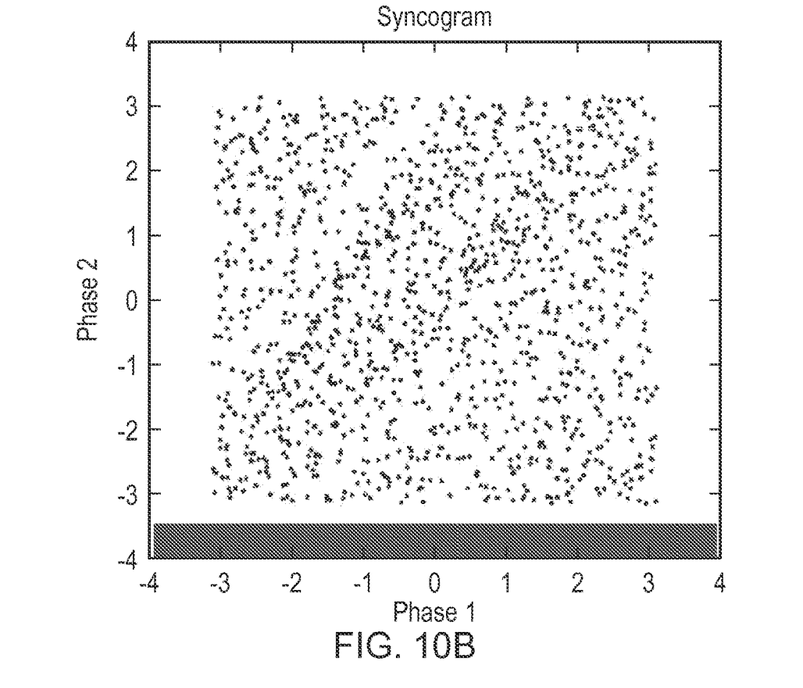

FIGS. 10A and 10B illustrate a plot of a phase angle of a first finger 41 against a phase angle of a second finger 41. The plots of FIGS. 10A and 10B use the same data as the plots of FIGS. 9A and 9B.

In FIG. 10A there is a strong banding around y=x which indicates that the fingers 41 are on the same hand. The banding around y=x is not present in FIG. 10B which indicates that the fingers 41 are on different hands.

Examples of the disclosure may provide an apparatus 1 which can differentiate between a user input made with a plurality of fingers 41 belonging to one hand and a user input made with a plurality of fingers 41 belonging to different hands.

This may enable the apparatus 1 to distinguish between a user input comprising a gesture made with a plurality of fingers 41 of the same hand and a gesture made with a plurality of fingers 41 of different hands. Different functions may be associated with the different user inputs.

For example, a user may make a pinch input using a plurality of fingers of the same hand. This could cause a zoom function to be performed where the zooming is carried out at first scale. The user could also make the pinch input using fingers from both their left and right hands. This could cause a zoom function where the zooming is carried out on a second scale. The second scale could be larger than the first scale. It is to be appreciated that other functions could be performed in response to the user inputs.

Examples of the disclosure may also enable the apparatus 1 to recognise user inputs made be a plurality of different users. This could be used to control the apparatus 1 to enable a multiplayer game or any other suitable type of function.

The blocks illustrated in the FIGS. 5 and 6 may represent steps in a method and/or sections of code in the computer program 9. The illustration of a particular order to the blocks does not necessarily imply that there is a required or preferred order for the blocks and the order and arrangement of the block may be varied. Furthermore, it may be possible for some blocks to be omitted.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this detailed description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples.

Thus "example", "for example" or "may" refers to a particular instance in a class of examples. A property of the instance can be a property of only that instance or a property of the class or a property of a sub-class of the class that includes some but not all of the instances in the class.

Although examples of the disclosure have been described in the preceding paragraphs with reference to various examples, it should be appreciated that modifications to the examples given can be made without departing from the scope of the invention as claimed. For example in the above described examples the user makes a user input without actually touching the touch pad 15. It is to be appreciated that in other examples the user may touch the touch pad 15 to make a user input.

In the described examples the tremor characteristic for a plurality of fingers 41 is determined and compared. In other examples the tremor characteristic may be determined for a user's hand which is holding the electronic device 19. This could be compared with tremor characteristics for a finger 41 used to actuate the touch pad 15. If there is a correlation then it can be determined that the finger 41 belongs to the hand which is holding the electronic device 19. If there is not a correlation then it can be determined that the finger 41 belongs to a different hand.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:

processing circuitry; and memory circuitry including computer program instructions, wherein the memory circuitry and the computer program instructions are configured, with the processing circuitry, to cause the apparatus to:

detect a first user input and a second user input made simultaneously by a first finger and a second finger, respectively, on a touch-sensitive display having a sensor array and a display;

identify a tremor characteristic for each of the first and second fingers, said tremor characteristic being determined for each of the first and second fingers by measuring movement of each of said first and second fingers in a direction perpendicular to said touch-sensitive display;

determine a correlation between the tremor characteristic of the first finger and the tremor characteristic of the second finger; and provide a first output signal from the first and second input signals when the correlation is above a threshold and a second output signal from the first and second input signals when the correlation is below a threshold, whereby the apparatus performs one function in response to the first output signal and another function in response to the second output signal.

2. The apparatus as claimed in claim 1 wherein the additional user input is made by more than two fingers and a tremor characteristic is identified for each of the more than two fingers.

3. The apparatus as claimed in claim 2 wherein a correlation among the tremor characteristics for the more than two fingers is determined.

4. The apparatus as claimed in claim 1 wherein, when the correlation is above the threshold, it is determined that the first and second fingers belong to the same hand and, when the correlation is below the threshold, it is determined that the first and second fingers belong to different hands.

5. The apparatus as claimed in claim 1 wherein the detected first and second user inputs are made by the first and second fingers, respectively, positioned close to the touch-sensitive display.

6. The apparatus as claimed in claim 1 wherein the first output signal causes a first function to be performed and the second output signal causes a second function different from the first function to be performed.

7. The apparatus as claimed in claim 1 wherein the tremor characteristic comprises the phase of a tremor.

8. The apparatus as claimed in claim 1 wherein the tremor characteristic comprises the amplitude of a tremor.

9. The apparatus as claimed in claim 1 wherein the sensor array of the touch-sensitive display includes one or more capacitive sensors.

10. The apparatus as claimed in claim 1 wherein a tremor is caused by unintentional movement of a user of the apparatus.

11. The apparatus as claimed in claim 1 wherein a tremor causes fluctuations in the signals provided by the sensor array within the touch-sensitive display.

12. An electronic device comprising the apparatus as claimed in claim 1.

13. A mobile telephone comprising the apparatus as claimed in claim 1.

14. A method comprising:
  detecting a first user input and a second user input made simultaneously by a first finger and a second finger, respectively, on a touch-sensitive display having a sensor array and a display;
  identifying a tremor characteristic for each of the first and second fingers, said tremor characteristic being determined for each of the first and second fingers by measuring movement of each of said first and second fingers in a direction perpendicular to said touch-sensitive display;
  determining a correlation between the tremor characteristic of the first finger and the tremor characteristic of the second finger; and
  providing a first output signal from the first and second input signals when the correlation is above a threshold and a second output signal from the first and second input signals when the correlation is below a threshold,
  whereby one function is performed by an apparatus in response to the first output signal and another function in response to the second output signal.

15. The method as claimed in claim 14 wherein additional user input is made by more than two fingers and a tremor characteristic is determined for each of the more than two fingers.

16. The method as claimed in claim 15 wherein a correlation between the tremor characteristics for the more than two fingers is determined.

17. The method as claimed in claim 14 wherein, when the correlation is above the threshold, it is determined that the first and second fingers belong to the same hand and, when the correlation is below the threshold, it is determined that the first and second fingers belong to different hands.

18. The method as claimed in claim 14 wherein the detected first and second user inputs are made by the first and second fingers, respectively, positioned close to the touch-sensitive display.

19. The method as claimed in claim 14 wherein at least one of the following applies:
  the first output signal causes a first function to be performed and the second output signal causes a second function different from the first function to be performed,
  the tremor characteristic comprises the phase of a tremor,
  the tremor characteristic comprises the amplitude of a tremor,
  the sensor array of the touch-sensitive display includes one or more capacitive sensors, wherein
  a tremor is caused by unintentional movement of a user of the apparatus, and
  a tremor causes fluctuations in the signals provided by the sensor array within the touch-sensitive display.

20. A non-transitory program storage device readable by a machine, said device tangibly embodying a program of instructions executable by a machine for performing operations, where, when the program of instructions is executed by processing circuitry of the machine, the operations perform at least the method as claimed in claim 14.

* * * * *

UNITED STATES PATENT AND TRADEMARK OFFICE
CERTIFICATE OF CORRECTION

PATENT NO. : 10,466,840 B2
APPLICATION NO. : 15/108989
DATED : November 5, 2019
INVENTOR(S) : Williamson Page 1 of 1

It is certified that error appears in the above-identified patent and that said Letters Patent is hereby corrected as shown below:

In the Claims

Claim 2, Column 13, Line 1 "the" should be deleted after wherein.

Signed and Sealed this
Eighteenth Day of February, 2020

Andrei Iancu
*Director of the United States Patent and Trademark Office*